(12) United States Patent
Zimprich

(10) Patent No.: US 6,318,534 B1
(45) Date of Patent: Nov. 20, 2001

(54) MULTI-DISK FRICTION DEVICE HAVING IMPROVED LUBRICATION CHARACTERISTICS

(75) Inventor: Dieter Zimprich, Eppelheim (DE)

(73) Assignee: Borg-Warner Automotive GmbH, Heidelberg (DE)

( * ) Notice: Subject to any disclaimer, the term of this patent is extended or adjusted under 35 U.S.C. 154(b) by 0 days.

(21) Appl. No.: 09/487,640

(22) Filed: Jan. 19, 2000

(30) Foreign Application Priority Data

Feb. 19, 1999 (DE) .............................................. 199 06 980

(51) Int. Cl.⁷ .............................. F16D 13/74; F16D 65/78
(52) U.S. Cl. .................................... 192/70.12; 188/264 B; 192/70.14; 192/107 R; 192/113.34
(58) Field of Search ............................. 192/70.12, 70.14, 192/107 R, 113.1, 113.3, 113.34; 188/71.6, 264 B

(56) References Cited

U.S. PATENT DOCUMENTS

| | | | |
|---|---|---|---|
| 4,219,246 | * 8/1980 | Ladin | 384/606 |
| 4,301,904 | * 11/1981 | Ahlen | 192/70.12 |
| 4,501,676 | * 2/1985 | Moorhouse | 508/104 |
| 4,667,534 | * 5/1987 | Kataoka | 192/70.12 X |
| 4,700,823 | * 10/1987 | Winckler | 192/113.34 X |
| 4,808,015 | * 2/1989 | Babcock | 384/609 |
| 5,899,310 | * 5/1999 | Mizuta | 192/107 R |

FOREIGN PATENT DOCUMENTS

| | | |
|---|---|---|
| 31 18 565 A1 | 11/1982 | (DE) . |
| 31 49 880 C2 | 7/1985 | (DE) . |
| 35 32 759 C1 | 3/1987 | (DE) . |
| WO 97/32678 | 9/1997 | (WO) . |

* cited by examiner

Primary Examiner—Rodney H. Bonck
(74) Attorney, Agent, or Firm—Bliss, McGlynn, P.C.; Greg Dziegielewski

(57) ABSTRACT

A multi-disk friction device includes a drive member having a plurality of drive disks supported for rotation with the drive member and a driven member having a plurality of driven disks supported for rotation with the driven member. The drive and driven disks are interleaved relative to each other such that each drive disk is adjacent to a driven disk and moveable toward and away from one another for providing selective frictional engagement therebetween and to transmit torque between the drive and driven members. Each of the drive and driven disks include a working face which is disposed for frictional engagement with the working face of an adjacent one of the disks. At least one of the working faces on an adjacent one of the disks includes a plurality of micro-pockets formed thereon. The micro-pockets act to store lubricating agents on the working faces.

11 Claims, 3 Drawing Sheets

MULTI-DISK FRICTION DEVICE HAVING IMPROVED LUBRICATION CHARACTERISTICS

BACKGROUND OF THE INVENTION

1. Field of the Invention

The present invention relates, generally, to multi-disk friction devices. More specifically, the present invention relates to a multi-disk friction device having improved lubrication characteristics.

2. Description of the Related Art

Multi-disk friction devices are employed in a wide range of applications as clutches or brakes. For example, such devices are frequently used in land-based vehicles. Generally speaking, such vehicles require three basic components: a power plant (such as an internal-combustion engine), a power-train, and wheels. The power-train's main component is typically referred to as the "transmission." Engine torque and speed are converted in the transmission in accordance with the tractive-power demand of the vehicle.

Transmissions include one or more gear sets, each of which may include an inner sun gear, intermediate planet gears supported by their carriers, and outer ring gears. Various components of the gear sets are held or powered to change the gear ratios in the transmission. The multi-disk pack-clutch is a friction device that is commonly employed as a holding mechanism in a transmission or differential. In addition, multi-disk friction devices also find use in industrial applications, such as wet brakes for braking the wheels on earth-moving equipment.

The multi-disk pack-clutch or brake assembly includes a plurality of ring-shaped disks and has a clutch sub-assembly. The sub-assembly includes a set of plates arranged in a torsionally rigid manner and fixed against displacement on a disk carrier as well as a set of friction disks interleaved between one another and fixed against displacement on a hub. The clutch or brake assembly also typically includes a piston. When a component of a gear set is to be held, as during a particular gear range, a piston is actuated so as to cause the plates and friction disks to come in contact with respect to one another. The plates mutually engage in a gearing manner, and the friction disks mutually engage in a gearing manner. The sets are mutually displaceable relative to each other in an axial direction and can be brought into and out of engagement in pairs. In "open pack" operation, the plates and friction disks normally turn past one another without contact. In certain applications, it is known to employ several multi-disk friction devices in combination to establish different drive connections throughout the transmission or differential to provide various gear ratios in operation or to brake a component.

Multi-disk clutches or multi-disk brakes having disks which are interconnected, i.e., made in a single piece from frictional material are also known in the related art. Examples of such devices are disclosed in DE 31 49 880 C2, DE 35 32 759 C1, and DE 31 18 565 A1.

Each friction disk includes a carrier plate made of, for instance, steel. The carrier plate includes a friction surface on at least one annular face thereof. The friction surface generally includes a fiber-material manufactured from paper or a paper-like material. The structure of the plate surfaces is generally smooth. The confronting faces of the interleaved plates and friction disks are, therefore, covered with frictional surfaces. WO 97/32678 discloses a special plate-surface structure made of steel used to improve the coefficient of friction in the pairings of the friction disks and plates.

When a friction device is engaged, kinetic energy is converted into thermal energy and a considerable amount of heat is generated. If the frictional surfaces get too hot, they can burn, which damages the friction surfaces and degrades the clutch's or brake's operational effectiveness. Additionally, the requirements placed on the service life of multi-disk clutches and similar units are exceptionally high. The frictional surfaces must be able to sustain a high, but undetermined, number of engagements without changing the power-transmission behavior, e.g., by wear and tear or lack of heat discharge.

As such, in the power-transmission units discussed above, lubrication of the individual components plays an important role. It must be ensured, in particular, that lubricating oil reaches the frictional surfaces of the disks. For this purpose, lubricating oil is typically sprayed onto the frictional surfaces.

However, during operation of the multi-disk clutch, a situation can occur in which a friction disk is deflected from its axially perpendicular position and performs a kind of wobbling motion. In this event, the friction disk assumes a certain minimal inclination toward the axially perpendicular direction. The consequence is that the portion of the edge of the friction disk that is deflected from the axially perpendicular position rests on the plate with which it cooperates, thus, causing a local area of high wear. This leads to a wearing off or removing of some of the oil film from the friction plate. Furthermore, a portion of the friction surface "drying out," may experience rapid localized wear and tear by overheating, and, ultimately, a complete breakdown of the friction disk and/or hot spots on the friction surface. This phenomenon occurs mainly when the clutch is disengaged, and not so frequently when the clutch is engaged.

It is known in the related art to provide the frictional surfaces with a porous, sponge-like structural arrangement, among others, such that a certain amount of oil storage is achieved. The stored oil is supplied to the frictional surfaces when the clutch is applied. It has been noticed, however, that in some cases, wear and tear will occur without the disks taking a decisive part in the power transmission. The breakdown of one of the disks will lead to the failure of the entire unit.

Accordingly, there remains a need in the art for a power-transmission unit, in particular, a multi-disk friction device such as a clutch or brake, the service life of which, specifically in "open pack" mode, is further increased as compared with known units and breakdowns of the disks of such units are avoided.

SUMMARY OF THE INVENTION

The present invention overcomes the disadvantages in the related art in a multi-disk friction device including a drive member having a plurality of drive disks supported for rotation with the drive member and a driven member having a plurality of driven disks supported for rotation with the driven member. The drive and driven disks are interleaved relative to each other such that each drive disk is adjacent to a driven disk and moveable toward and away from one another for providing selective frictional engagement therebetween and to transmit torque between the drive and driven members. Each of the drive and driven disks include a working face which is disposed for frictional engagement with the working face of an adjacent one of the disks. At least one of the working faces on an adjacent one of the disks includes a plurality of micro-pockets formed thereon. The micro-pockets act to store lubricating agents on the working faces.

Accordingly, one advantage of the present invention is that at least one of the drive or driven disks is provided with micro-pockets that ensure that the working face is provided with a residual supply of lubricating oil when the friction disk, which is deflected from its axially perpendicular position, rests with a portion of its edge on the working face of the adjacent disk in an abrading manner.

Another advantage of the present invention is that the micro-pockets ensure that the working face is provided with a residual supply of lubricating oil when centrifugal forces try to eject the oil film from the working face.

Still, another advantage of the present invention is that the oil pockets discharge the heat incurred during the "closed pack" operating mode of the friction device.

Still, another advantage of the present invention is that the micro-pockets reduce the drag moment of the interleaved rotating disks operating in the "open pack" mode.

Still, another advantage of the present invention is that the micro-pockets improve the friction properties of the multi-disk friction device.

Finally, these advantages are achieved in a multi-disk friction device such as a disk of a clutch or brake, that is operationally efficient and cost-effective to manufacture relative to the multi-disk friction devices known in the related art.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
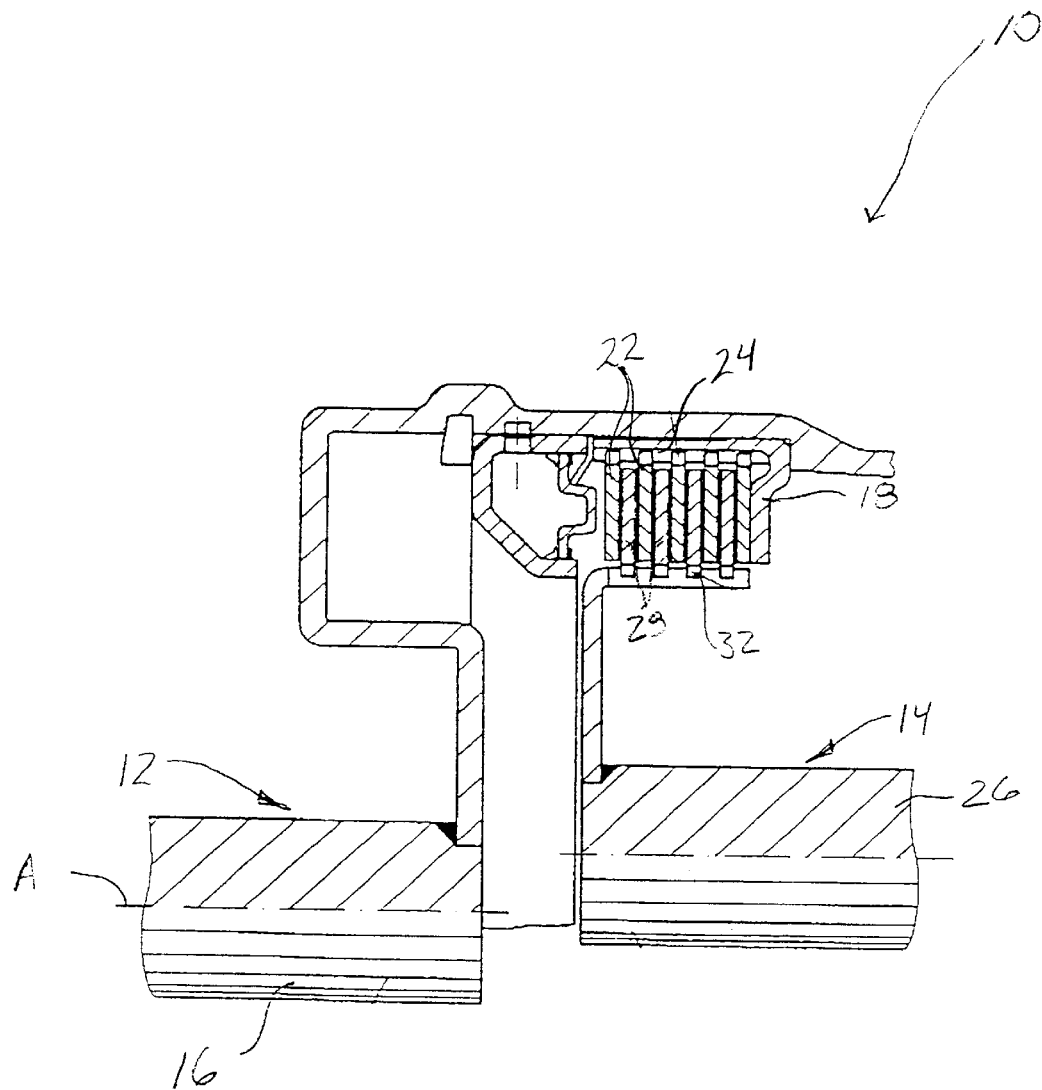
FIG. 1 is a cross-sectional schematic view of a multi-disk friction device of the present invention.

Referring now to FIG. 1, a multi-disk friction device, such as a clutch or brake assembly, is generally indicated at 10. The friction device 10 is adapted to be employed in connection with a transmission, differential, or brake system. For example only and not by way of limitation, as is commonly known in the art, but not shown in these figures, transmission assemblies typically include an input shaft that is operatively coupled to a prime mover, such as an internal-combustion engine. In an automotive application, the transmission assembly also includes an output shaft that is operatively coupled to driven wheels through other drive-train components, such as a drive shaft and an axle having a differential. At least one gear set (often, a plurality of gear sets) is operatively coupled between the input and output shafts. A transmission casing supports the input shaft, output shaft, and gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further and notwithstanding the automotive-related context of the discussion above, from the description that follows, those having ordinary skill in the art will appreciate that the present invention may be employed in a transmission, differential, or brake system whether used in an automotive, non-automotive, or industrial application. Thus, to the extent the term "clutch" is used below in any context, this term should be given its broadest possible meaning, including, but not limited to, clutches and brakes for use in transmission, differential, or braking systems of all types.

Figure 2:
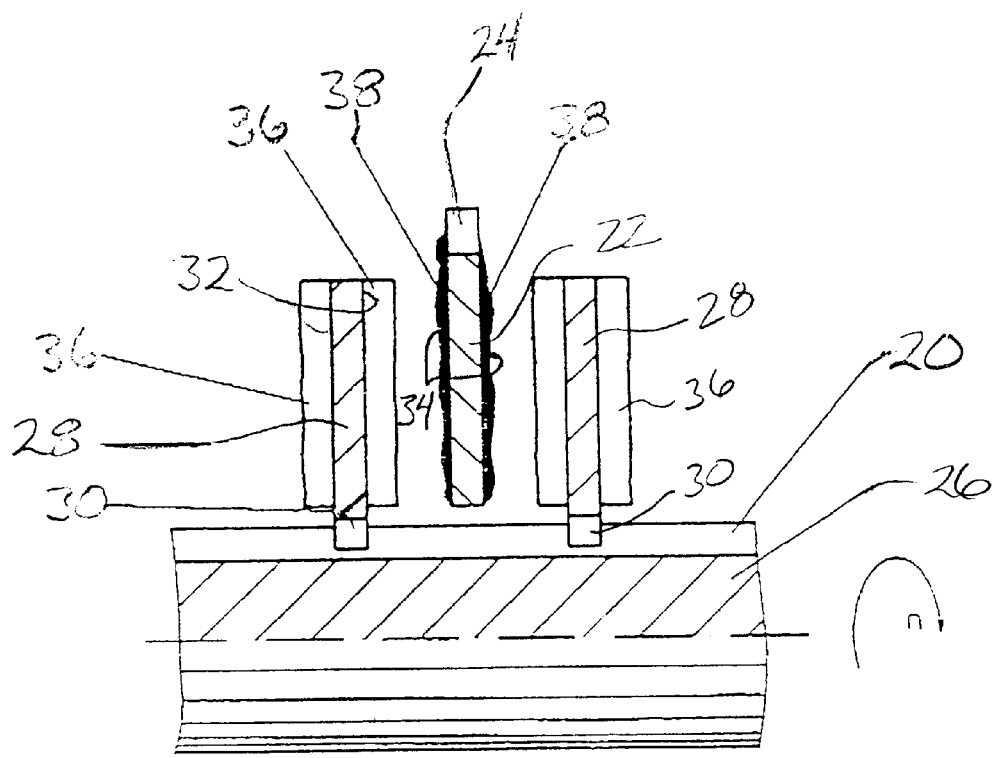
FIG. 2 is an enlarged, partial cross-sectional view of the multi-disk friction device of FIG. 1.
Figure 3:
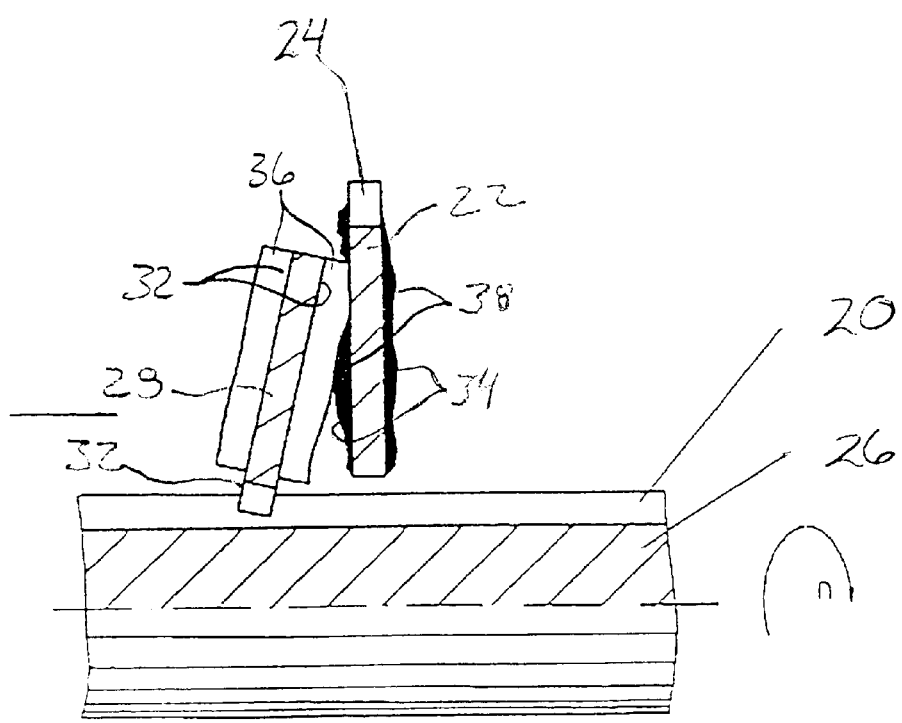
FIG. 3 is an enlarged view of the subject matter of FIG. 2 showing a deflection of a friction disk from an axially perpendicular plane.

As shown in the figures, the friction device 10, or clutch, is provided with a drive member, generally indicated at 12, and a driven member, generally indicated at 14. The drive member 12 includes a drive shaft 16. FIG. 1 shows the drive shaft 16 rigidly connected to a disk carrier 18 for rotation about an axis "A" of the drive shaft 16 as will be described in greater detail below. Similarly, the driven member 14 includes a driven hub 26. As shown in FIGS. 2 and 3, the driven hub 26 may include axially extending splines 20 disposed about the annular periphery of the hub 26. A plurality of annular, outer drive disks 22 are splined or otherwise mounted at 24 for axial movement relative to the disk carrier 18 and are rotatably supported thereby. A plurality of annular, inner driven disks 28 are splined or otherwise mounted at 30 to the hub 26 and are rotatably carried thereby. Thus, the outer drive 22 and inner driven 28 disks are interleaved and rotate past one another when the clutch 10 is in "open pack" mode as is commonly known in the art.

Each disk 22, 28 includes a working face having a predetermined thickness that can be brought into engagement with the working face of an adjacent disk 22, 28 to transmit a torque to the adjacent disk 22, 28. For example, in the figures, each inner disk 28 has a working face 32 that is engageable with a working face 34 of an outer disk 22 to transmit a torque to the outer disk 22. In a preferred embodiment, each disk 22, 28 is made of metal and includes a surface which is treated so as to frictionally engage a like surface on an adjacent disk as will be described in greater detail below.

Figure 4:
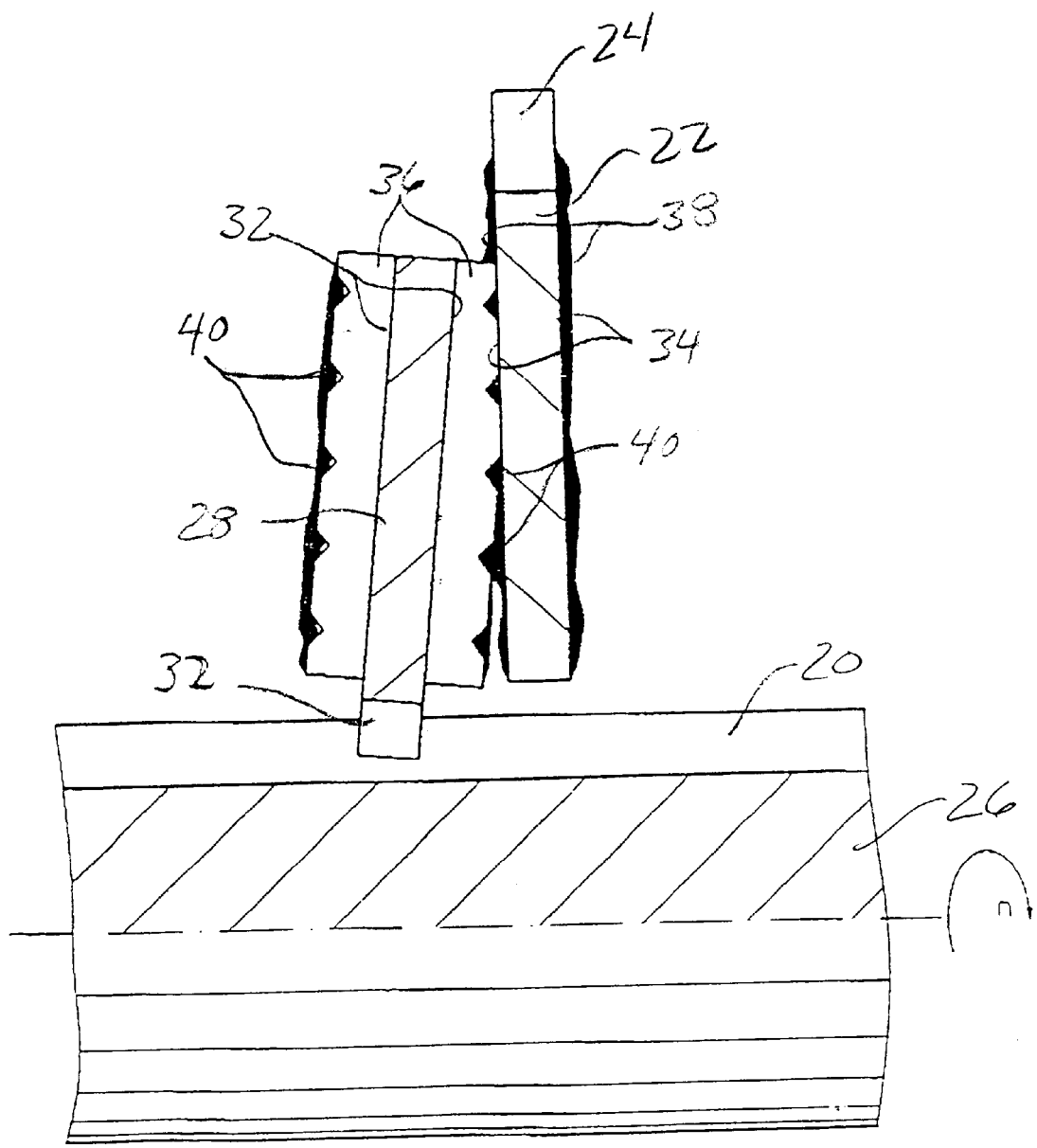
FIG. 4 is an enlarged view of FIG. 3 showing a possible arrangement of the micro-pockets of the present invention.

More specifically and as shown in FIG. 2, the inner, driven disks 28 are provided on both sides with a friction coating 36, which, in a preferred embodiment, is made of a paper-like substance. The friction coatings 36 cooperate in an engaged state with the working face 34 of an adjacent outer disk 22. As shown in FIGS. 2 through 4, the working face 34 of the outer disk 22 is bathed with a lubricating agent, such as oil, forming an oil film 38.

As shown in an exaggerated manner in FIGS. 3 and 4, an inner disk 28 may become deflected from an axially perpendicular position. In this event, the radially outer edge of the friction coating 36 of the inner disk 28 may rest on the working face 34 of the outer disk 22 and generate a local area of high wear. In this process, the radially outer edge of the friction coating 36 locally displaces the oil film 38.

In accordance with the present invention, a plurality of micro-pockets are 40 formed on at least one, and preferably both, of the working faces 32, 34 for the storage of lubricating agents. In other words, the outer disks 22 and/or the inner disks 28 are provided with the micro-fine pockets 40. As shown in FIG. 4, the micro-pockets 40 are formed on the friction coatings 36 of the inner disk 28. However, those having ordinary skill in the art will appreciate from the description herein that the micro-pockets 40 may be formed on either working face 32, 34 of the inner and outer disks 28, 22, respectively, or the friction coatings 36 disposed on the working face 32, 34 of either or both of the inner and outer disks 28, 22.

To this end, the friction coating 36 is arranged to include elevations and recesses such that an effective supply of oil is still present on the respective disk 22, 28 via the micro-pockets 40. In this regard, the size of the micro-pockets 40 can be in the macroscopic range or microscopically small such that the micro-pockets 40 are not easily recognizable with the naked eye. Also, the micro-pockets 40 can be applied on many kinds of known friction surfaces, e.g., those provided with grooves extending in the radial, tangential, or concentric direction from the inside to the outside. However, in a preferred embodiment, the structure of the friction coating 36 is regular, predetermined by design, such as in the case of a fabric imprint. In any event, the micro-pockets 40 are provided with a depth sufficient to hold the lubricating agents. In a preferred embodiment, the micro-pockets 40 are provided with a depth of 30% of the thickness of the working faces 32, 34 or the friction coating 36.

The structure of the friction coating 36 can be produced by any method for applying or removing material, including mechanical means. For instance, if the friction coatings 36 are manufactured from a material that is produced on a paper machine, as discussed above, then non-finished paper that still has the structure of the paper-machine wire-cloth or felt from the production process can be used. It is also possible to provide the micro-pockets 40 on the surface of the friction coating 36 by an embossing or rolling process during or after the production of the friction coatings 36.

Non-mechanical means are also possible to achieve the desired micro-pocketed structure of the friction coating 36. For instance, the micro-pocketed structure of the friction surface can be formed by chemical treatment, such as by application of an etching process for sintered coatings. A laser treatment of the working faces 32. 34 and/or friction coating 36 may also be employed.

In operation, the oil retaining micro-pockets 40 ensure that the working face 34 of the outer disk 22 is provided with a residual supply of lubricating oil when the inner disk 28, which is deflected from an axially perpendicular position, rests with its end-edge on the working face 34 of the outer disk 22 in an abrading manner or when centrifugal forces try to eject the oil film 38. The micro-pockets 40 remain filled with oil to the extent that, even if the illustrated deflection or tilting occurs, there still is sufficient lubrication between the friction disks. In other words, the micro-pockets 40 prevent any dry running in the contact zone between the inner disk 28 and the outer disk 22.

As a result, the micro-pockets 40 lead to improvements of the friction properties of the disk 22, 28, including constancy of the coefficient of friction and power absorption during the shifting operation. Furthermore, with known friction surfaces of a kind discussed above, the micro-pockets 40 can be made to allow for a particular oil flow or catch oil in limited areas of the disk 22, 28 such that the heat incurred during the work of the friction device 10 is discharged. In addition, the micro-pockets 40 can be made to produce an oil flow in an axial direction, which reduces the drag moment of the disks in idle running.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What we claim is:

1. A multi-disk friction device comprising:

a drive member having a plurality of drive disks supported for rotation with said drive member and a driven member having a plurality of driven disks supported for rotation with said driven member, said drive and driven disks interleaved relative to each other such that each drive disk is adjacent a driven disk and moveable toward and away from one another for providing selective frictional engagement therebetween and to transmit torque between said drive and driven members;

each of said drive and driven disks including a working face which is disposed for frictional engagement with the working face of an adjacent one of said disks, at least one of said working faces on said adjacent one of said disks including a plurality of micro-pockets formed thereon with a depth of thirty percent of the thickness of said working face and arranged in a predetermined pattern relative to one another, said micro-pockets acting to store lubricating agents on said working face.

2. A multi-disk friction device as set forth in claim 1 wherein said working face includes a friction coating, said plurality of micro-pockets being formed on said friction coating.

3. A multi-disk friction device as set forth in claim 2 wherein both of said working faces on said drive and driven disks include a friction coating.

4. A multi-disk friction device as set forth in claim 2 wherein said friction coating is a fabric imprint.

5. A multi-disk friction device as set forth in claim 2 wherein said friction coating is made of a paper based product.

6. A multi-disk friction device as set forth in claim 1 wherein said working faces on both said drive and driven disks include a plurality of micro-pockets.

7. A multi-disk friction device as set forth in claim 1 wherein the other of said drive and driven disks include an oil film formed on said working face.

8. A multi-disk friction device as set forth in claim 1 wherein said micro-pockets are provided with a depth sufficient to hold said lubricating agents.

9. A multi-disk friction device as set forth in claim 1 wherein said plurality of micro-pockets on at least one of said working faces of said adjacent disks is produced by mechanical means.

10. A multi-disk friction device as set forth in claim 1 wherein said plurality of micro-pockets on at least one of said working faces of said adjacent disks is produced by applying or removing material thereto.

11. A multi-disk friction device as set forth in claim 1 wherein said plurality of micro-pockets on at least one of said working faces of said adjacent disks is produced by chemical treatment.

* * * * *